United States Patent [19]

Krisl et al.

[11] Patent Number: 5,982,078
[45] Date of Patent: Nov. 9, 1999

[54] OPTICAL INTERFERENCE COATINGS AND LAMPS USING SAME

[75] Inventors: M. Eric Krisl, Santa Rosa, Calif.;
Robert L. Bateman, Chagrin Falls, Ohio

[73] Assignee: General Electric Company, Schenectady, N.Y.

[21] Appl. No.: 08/249,650

[22] Filed: May 26, 1994

Related U.S. Application Data

[60] Continuation of application No. 07/831,706, Feb. 5, 1992, abandoned, which is a division of application No. 07/708,825, May 29, 1991, Pat. No. 5,138,219, which is a continuation of application No. 07/382,153, Jul. 19, 1989, abandoned.

[51] Int. Cl.$^6$ ............................................. H01J 5/08
[52] U.S. Cl. ............................................. 313/112; 359/359
[58] Field of Search .................... 313/112, 579; 350/1.6, 1.7, 164, 166; 362/255; 359/359, 350

[56] References Cited

U.S. PATENT DOCUMENTS

| | | | |
|---|---|---|---|
| 4,229,066 | 10/1980 | Bancourt et al. | 350/1.6 |
| 4,524,410 | 6/1985 | Kawakatsu et al. | 362/255 |
| 4,588,923 | 5/1986 | Hoegler et al. | 313/579 |
| 4,663,557 | 5/1987 | Martin, Jr. et al. | 313/112 |
| 4,689,519 | 8/1987 | Ooms et al. | 313/112 |
| 4,701,663 | 10/1987 | Kawakatsu et al. | 313/112 |
| 4,734,614 | 3/1988 | Kuus | 313/112 |
| 4,896,928 | 1/1990 | Perilloux et al. | 350/1.6 |
| 4,940,636 | 7/1990 | Brock et al. | 350/164 |

FOREIGN PATENT DOCUMENTS

| | | |
|---|---|---|
| 41-21327 | 10/1966 | Japan . |
| 61-296304 | 12/1986 | Japan . |

OTHER PUBLICATIONS

"Computer—aided Multilayer Design of Optical Filters with Wide Transmittance Bands Using $SiO_2$ and $TiO_2$", A.G. Lotz, Applied Optics, vol. 26, No. 20, pp. 4487–4490, Oct. 1987.

*Primary Examiner*—Michael Horabik
*Attorney, Agent, or Firm*—Fay, Sparpe, Beall, Fagan, Minnich & McKee

[57] ABSTRACT

Optical interference coatings useful on lamps for transmitting visible light radiation at about 90% average from 400–770 nm and for reflecting infrared radiation comprise three spectrally adjacent multiperiod stacks of alternating high and low index of refraction layers. Compared to conventional filters, these filters have a greater tolerance to layer thickness variations incurred during manufacture with little or no color shift when viewed at non-normal angles.

43 Claims, 6 Drawing Sheets wherein x, y, and z are whole numbers $\geq 2$ and preferably $\geq 3$ $2 \leq a, a' \leq 4$
$5 \leq b, b' \leq 15$
$5 \leq c, c' \leq 15$
$1 \leq d, d' \leq 2.5$

OPTICAL INTERFERENCE COATINGS AND LAMPS USING SAME

This application is a continuation of application Ser. No. 07/831,706, filed Feb. 5, 1992, now abandoned which is a divisional of application Ser. No. 07/708,825, filed May 29, 1991, now U.S. Pat. No. 5,138,219 which is a continuation of Ser. No. 07/382,153, filed Jul. 9, 1989 now abandoned.

BACKGROUND OF THE INVENTION

1. Field of the Invention

This invention relates to thin layer optical interference coatings for reflecting infrared radiation and transmitting visible light radiation and their use on lamps. More particularly, this invention relates to optical interference coatings made of alternating high and low refractive index layers for reflecting infrared radiation and transmitting visible light radiation which comprise three spectrally adjacent multiperiod stacks with the first stack being a conventional short wave pass stack having at least two periods and with the second and third stacks each comprising at least two periods and being spectrally located at increasingly longer wavelengths than the first stack, and lamps containing such filters.

2. Background of the Disclosure

Thin film optical interference coatings known as interference filters which comprise alternating layers of two or more materials of different refractive index are well known to those skilled in the art. Such coatings or films are used to selectively reflect and/or transmit light radiation from various portions of the electromagnetic spectrum such as ultraviolet, visible and infrared radiation. These films or coatings are used in the lamp industry to coat reflectors and lamp envelopes. One application in which these thin film optical coatings have been found to be useful is to improve the illumination efficiency or efficacy of incandescent and arc lamps by reflecting infrared radiation emitted by a filament or arc back to the filament or arc while transmitting the visible light portion of the electromagnetic spectrum emitted by the filament or arc. This lowers the amount of electrical energy required to be supplied to the filament or arc to maintain its operating temperature. In other lamp applications where it is desired to transmit infrared radiation, such filters can reflect the shorter wavelength portions of the spectrum, such as ultraviolet and visible light portions emitted by a filament or arc and transmit primarily the infrared portion in order to provide heat radiation with little or no visible light radiation. Such an application of this latter type would include a typical radiant heater for residential or industrial use where visible radiation emitted by the heater is unwanted.

Optical interference coatings or filters used for applications where the filter will be exposed to high temperatures in excess of 500° C. or so have been made of alternating layers of refractory metal oxides such as tantala (tantalum pentoxide $Ta_2O_5$), titania (titanium dioxide $TiO_2$), niobia (niobium pentoxide $Nb_2O_5$) and silica ($SiO_2$), wherein the silica is the low refractive index material and the tantala, titania or niobia is the high refractive index material. Such filters and lamps employing same are disclosed, for example, in U.S. Pat. Nos. 4,588,923; 4,663,557 4,689,519 and 4,734,614. In such lamp applications, the filters are applied on the outside surface of the vitreous lamp envelope containing the filament or arc within and often reach operating temperatures as high as 900° C. These interference filters or coatings are applied using evaporation or sputtering techniques and also by chemical vapor deposition (CVD) and low pressure chemical vapor deposition (LPCVD) processes. Some attempts to make such interference filters have employed solution deposition techniques such as is disclosed in U.S. Pat. No. 4,701,663. Solution deposition techniques however produce relatively thick layers which tend to crack and which severely limits the filter design. CVD and particularly LPCVD deposition processes are preferred for applying coatings to other than flat objects such as reflectors and lamps.

SUMMARY OF THE INVENTION

The present invention relates to an optical interference coating for reflecting infrared radiation and transmitting visible light radiation which comprises a plurality of alternating high and low refractive index layers and has a spectrally broad high transmittance of an average of at least about 90% between about 400 to 770 nm and a spectrally broad high reflectance of an average of at least about 70% between about 800 to 1900 nm. In a preferred embodiment these filters comprise three multiperiod, spectrally adjacent stacks with all three of the stacks having at least two periods wherein one of the stacks is a conventional short wave pass stack and wherein the other two stacks are spectrally located at wavelengths different from each other and longer than the wavelength of the short wave pass stack.

The filter of the present invention will preferably be the result of a computer optimization of a filter design comprising three spectrally adjacent multiperiod stacks with said first stack being a conventional short wave pass stack having at least two periods and with said second and third stacks being spectrally located at wavelengths different from each other and longer than the wavelength of the first stack and comprising at least two periods for each stack, with each period of said second and third stacks containing seven alternating layers of high and low refractive index materials of the form:

$$\left(\frac{L}{a}\frac{H}{b}\frac{L}{c}\frac{H}{d}\frac{L}{c}\frac{H}{b}\frac{L}{a}\right)$$

wherein $2 \leq a \leq 4$
$5 \leq b \leq 15$
$5 \leq c \leq 15$
$1 \leq d \leq 2.5$ and wherein L and H represent the low and high index of refraction materials, respectively, L and H each being defined as having an optical thickness of a quarterwave of the stack wavelength. Accordingly, the notation ¼ represents a fraction of a quarterwave of optical thickness of the L material at the stack wavelength, i.e., one-half of a quarterwave (⅛ wave) for a=2. The very thin layers ⅛ and ¼ have an optical thickness no greater than one-twentieth of the stack wavelength and serve to frustrate the higher order reflectance bands of the stack which would interfere with light transmittance in the visual spectral region. The optical thickness of the other layers of these periods will be nearly equal to, but less than those which would be found in a conventional short wave pass stack of the same stack wavelength.

As set forth above, the filters of the present invention provide a spectrally broad high transmittance region across the visible spectrum of at least about 90% average between about 400–770 nm and a spectrally broad high reflectance region of at least about 70% average across the near infrared spectrum between about 800–1900 nm. These coatings have been found to be particularly useful on the vitreous envelopes of lamps for increasing the efficiency and efficacy of the lamp for visible light transmission by reflecting the infrared radiation back to the filament or arc to increase the efficacy of the lamp.

In a particularly preferred embodiment the first stack is the outermost stack which interfaces with the atmosphere (ambient) and is the shortest wavelength stack, being a conventional short wave pass quarterwave stack having at least two and preferably at the least three periods of alternating high and low refractive index layers comprising a high refractive index central layer having an optical thickness of about a quarter of the stack wavelength with a low refractive index layer adjacent both sides of the central layer and with said low refractive index layers each having an optical thickness of about an eighth of the stack wavelength.

DETAILED DESCRIPTION

Figure 1:
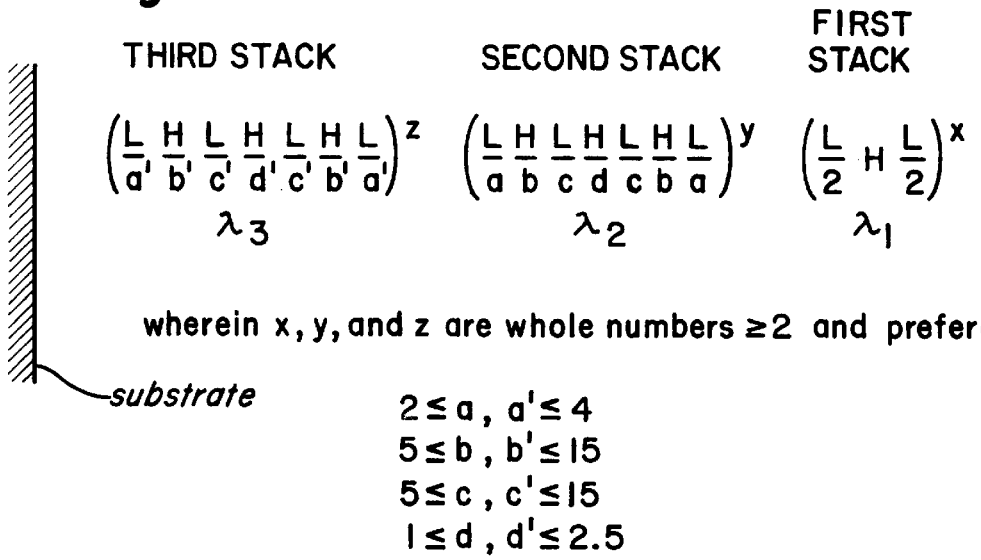
FIG. 1 is a graphic representation of the filter according to the present invention illustrating the stacks and the periods in the stacks.

The invention relates to the use of thin coating layers in a multilayer coating design to achieve what is called hot mirror performance for reflecting infrared radiation and transmitting visible light radiation. If one attempts to make interference filter hot mirror coatings comprising alternating layers of two different materials having high and low indices of refraction at conventional layer thickness of, i.e., about 1000 Å or more, the width of the visual window in transmission is primarily determined by the refractive index ratio of the coating materials. Since the selection of suitable materials can be limited due to temperature and other considerations, the width of the visible transmission window can also be limited. In the case of infrared reflective coatings for lamp envelopes, temperature considerations tend to limit the materials which can be used for the coating. One approach to widening the visual transmission window would be to use three coating materials, with the third material having an index of refraction somewhere in between the high and low index materials, with the necessary intermediate index of refraction being determined by the index of refraction of the other two materials. Although this will work for lamp applications, the three material approach is limited by the availability of suitable coating materials having the necessary refractive indices, physical and chemical compatibility and by the stress buildup occurring in a coating from using three different materials having three different coefficients of thermal expansion.

By using thin layers according to the present invention, one can obtain a filter that provides a spectrally broad, high transmittance region across the visible spectrum and a spectrally broad, high reflectance region across the near infrared portion of the spectrum. By thin layers is meant at least some of the layers in the second and third stacks have an optical thickness no greater than one-fifth of a quarterwave of the stack wavelength or no greater than one-twentieth of the stack wavelength. A performance similar to employing three different materials can be achieved using only two materials in filters according to the present invention.

A thin layer interference filter optical coating also provides less sensitivity to layer thickness errors. If a systematic optical thickness error occurs such that all the layers are either too thick or too thin, the effect will be a shift in the transmission window in the visible wavelength to a longer or a shorter wavelength, respectively. A wider window will allow for a larger shift before the apparent color of the lamp employing the filter is changed. The greater tolerance to layer thickness variation in the coating of the present invention also provides more leeway with respect to both mismatch errors and random errors. Mismatch errors are defined as coating process systematic errors which produce a final coating in which the optical thickness of all the layers of one material is thicker than desired and the optical thickness of all the layers of the other material is thinner than desired. This type of error does not shift the location of the visible window, but does degrade the high transmittance level and observed color. Random errors are errors in coating layer thickness which occur randomly as a result of normal imperfections in manufacturing process control. This error type also degrades transmittance and observed color. Using a thin layer filter according to the present invention provides a significant advantage in increased load sizes, less costly deposition control systems and higher product yield.

When a lamp employing conventional IR reflecting coatings or filters is viewed at angles other than normal to the surface, the observed effect is a spectral shift in the window location to shorter wavelengths which make the lamp appear blue or blue-green. The wider window of the coating of this invention provides a larger allowable viewing angle off normal before color change is observed.

As set forth above, The present invention relates to an optical interference coating for reflecting infrared radiation and transmitting visible light radiation which comprises a plurality of alternating high and low refractive index layers and has a spectrally broad high transmittance of an average of at least about 90% between about 400 to 770 nm and a spectrally broad high reflectance of an average of at least about 70% between about 800 to 1900 nm. These filters will preferably comprise three multiperiod, spectrally adjacent stacks with all three of the stacks having at least two periods wherein one of the stacks is a conventional short wave pass stack and wherein the other two stacks are spectrally located at wavelengths different from each other and longer than the wavelength of the short wave pass stack. Thus, the light interference filters of the present invention comprise three spectrally adjacent multiperiod stacks all three of which have at least two periods, with one of the stacks being designated as the first stack and being a short wave pass quarterwave stack having at least two periods and with the second and third stacks spectrally located at wavelengths longer than that of the first stack and different from each other and comprising at least two and preferably at least three periods. In a preferred embodiment the periods of the second and third stacks are based on a design wherein each period contains seven alternating layers of high and low refractive index materials of the form:

$$\left(\frac{L}{a}\frac{H}{b}\frac{L}{c}\frac{H}{d}\frac{L}{c}\frac{H}{b}\frac{L}{a}\right)$$

wherein $2 \leq a \leq 4$
$5 \leq b \leq 15$
$5 \leq c \leq 15$
$1 \leq d \leq 2.5$ and wherein L and H are the low and high index of refraction materials, respectively, each being defined as having an optical thickness of a quarterwave of the stack wavelength. In a particularly preferred embodiment the design will be optimized by computer refinement as is well known to those skilled in the art. Most (i.e., more than half) of these periods will still contain seven alternating layers after computer optimization of the design. By stack wavelength is meant the wavelength where the strongest reflection or stop band is located. By spectrally adjacent stacks is meant that the longest high reflectance wavelength of one stack coincides approximately with the shortest high reflectance wavelength of the other stack. As a practical matter, the high reflectance regions of two spectrally adjacent stacks slightly overlap.

It is preferred that the first or short wave pass stack be a conventional short wave pass stack of the form:

$$\left(\frac{L}{2}H\frac{L}{2}\right)$$

and have at least two, preferably at least three and more preferably at least four periods, with H and L being high and low index of refraction materials, respectively, and each defined as having an optical thickness of one-quarter of the stack wavelength. Thus ½ is about one-eighth of the stack wavelength. Another form of commonly used notation is (LH). The actual thicknesses of the layers in the stack as shown can vary by about ±10%.

The invention will be more easily understood by reference to FIG. 1. FIG. 1 is a graphic representation of the three stack filter design of the present invention. L and H represent the low and high index of refraction materials, respectively, and each have an optical thickness defined as one-quarter of the stack wavelength, or a quarterwave optical thickness. Layers forming a period are surrounded by parenthesis, with the superscript being the number of times the period is repeated in the stack. The first stack is the shortest wavelength stack and is a conventional shortwave pass stack having a stack wavelength of λ. This is shown in the preferred embodiment as being in contact with the ambient in order to achieve the least amount of ripple and to provide the greatest amount of transmission in the visible region. The first stack has at least two periods with each of said periods consisting of a high refractive index central layer having an optical thickness of about a quarter of the stack wavelength with a low refractive index layer adjacent both sides of the central layer and having an optical thickness of about one-eighth wave of the stack wavelength. The superscript x indicates the minimum number of periods repeated in this first stack which is at least two, preferably at least three and still more preferably at least four.

The second and third stacks are spectrally located at increasingly longer wavelengths and consist of at least two and preferably at least three periods of the seven layer structure of alternating low and high index of refraction materials of the form defined above and under SUMMARY OF THE INVENTION. As shown in FIG. 1, layers 1, 4 and 7 (starting with the leftmost layer in each period) of each seven layer period have optical thicknesses nearly equal to, but less than those found in the conventional short wave pass stack discussed above and layers 2, 3, 5 and 6 are substantially thinner layers having an optical thickness no greater than one-twentieth of the stack wavelength which serve to frustrate the higher order reflectance bands of the stack which interfere with high transmittance in the visual spectral region. As a practical matter, the physical thickness of layers 2, 3, 5 and 6 will generally be less than about 400 Å and even less than 300 Å. Another way of expressing the layer thicknesses in the seven layer periods which make up the second and subsequent stacks is that each period has a central layer of high refractive index material having an optical thickness no greater than, and generally less than, one quarter of the stack wavelength with a pair of low and high refractive index layers being adjacent both sides of said central layer wherein each of said two layers of each of said two pairs has an optical thickness no greater than, and generally less than, one twentieth of the stack wavelength with the low refractive index layer in each pair being adjacent said central layer and with a low refractive index layer having an optical thickness no greater than, and generally less than, one eighth of the stack wavelength being adjacent each high refractive index layer of each pair. Thus, the optical thickness of two of the high refractive index layers and two of the low refractive index layers in each seven layer period will not exceed one-twentieth of the stack wavelength.

Figure 2:
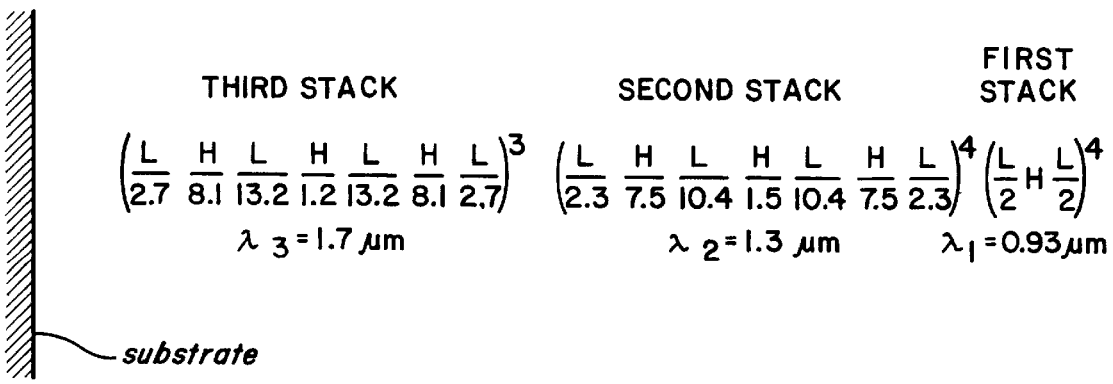
FIG. 2 is a graphic representation of an actual filter design according to the present invention wherein the optical thickness of each layer has a definite value.

FIG. 2 is a graphic illustration of an actual filter design according to an embodiment of this invention. In this representation, H and L again refer to a high and low index of refraction material, respectively, each defined as having an optical thickness of a quarter of the stack wavelength. In this illustration, the first stack, which is the conventional short wave pass quarterwave stack, has a design wavelength of 930 nm which means that the optical thickness of both H and L is one-quarter of 930. Thus, both H and L in this particular illustration have an optical thickness of 233 nm. Similarly for the second stack at the design wavelength of 1300 nm, the value of H and L is equal to one-quarter of 1300 or 333 nm and for the third stack, the value of H and L is one-quarter of 1700 or 425 nm.

In FIG. 2, the x, y and z values are shown as 4, 4 and 3, respectively, which means that the first and second stacks each have four periods and the third stack has three periods. The values for a, b, c, d, a', b', c' and d' are shown in the denominator for each of the stacks. Thus, the optical thickness $T_o$ of, for example, the central layer (H/1.2) of each period in the third stack, with H having been defined as one quarterwave of the stack wavelength λ, or λ/4, is 1700 nm/(4×1.2) or 354 nm. The physical thickness $T_p$ of this layer is the optical thickness divided by the index of refraction n of the layer material ($T_p = T_o/n$). If the high refractive index material is tantala ($Ta_2O_5$) which has an index of refraction of about 2.2 at the stack wavelength of 1700 nm, then the physical thickness of the central layer of each period in the third stack is 161 nm or 1610 Å.

Applying the arithmetic calculations set forth in the preceding paragraph to the complete filter design illustrated in FIG. 2 for alternating layers of high and low refractive index layer materials consisting of tantala ($Ta_2O_5$) and silica ($SiO_2$) having an index of refraction of 2.2 and 1.46, respectively, yields the number of layers and physical thickness of each layer set forth in Table 1 below. Referring to FIG. 2, layer count runs left to right with the first layer on the substrate on the left. When a period is repeated, the two adjacent low index of refraction layers ($SiO_2$) are combined into one layer shown in the Table. That is, in applying the alternating layers of silica and tantala, adjacent silica layers according to the design are applied as a single layer. For example, the thickness of the first and seventh layers of the periods in the second stack is 968 Å. Thus, in Table 1, layer 25 is 1936 Å, because it is a combination of the first and last layers of adjacent periods of the second stack. Similarly the low index of refraction layers of adjacent periods from different stacks are also combined into one layer in the Table. Also, the illustration in Table 1 is for a filter on a silica substrate. In this case, the first layer applied is a layer of $SiO_2$ which acts as an adhesion layer and can be any thickness, since it has essentially the same composition as the silica substrate. For this particular filter the first layer of silica is arbitrarily applied as 500 Å thick.

Referring again to Table 1, the third stack is made of three (3) periods, each of which is represented by z or z repeated three times. Similarly, the second and first stack are both represented by four (4) periods which are identified by the respective letters y and x. This then is an actual filter design according to the present invention showing the number of layers of tantala and silica and the physical thickness of each layer. This design is then preferably refined by computer optimization as is well known to those skilled in the art. There are a large number of computer programs commercially available for optimizing multilayer coatings and one such list of some fifteen vendors and programs may be found on page 144 of the September, 1988 issue of PHOTONICS SPECTRA magazine, an optics industry trade journal. Included in this list as illustrative, but nonlimiting examples, are CAMS which is available from Optikos located at 143 Albany Street, Cambridge, Mass. 02139, and FILM*STAR™ available from FTG Software Associates at P.O. Box 579, Princeton, N.J. 08524.

The filter design for the $SiO_2/Ta_2O_5$ filter set forth in Table 1 was computer optimized which resulted in elimination of four of the layers in one of the periods in the second stack, yielding forty-seven (47) layers having a total thickness of 39283 Å (starting with the first layer held constant at 500 Å), as compared to 39048 Å for the preoptimized design in Table 1. The computer optimized design is shown in Table 2. Turning to Table 2, one can observe that the computer refinement of the design in Table 1 resulted in eliminating the four thin layers in one of the periods in the second stack. Thus, in this embodiment, the optical interference coating of the present invention contains more than forty layers with no single layer being more than 1500 or 3000 Å thick and with a total thickness of no more than about 40,000 Å. It should be noted that the layer thicknesses shown in Tables 1 and 2 may vary ±10% without seriously effecting the performance of the filter.

TABLE 1

| Layer Number | Material | Thickness Å | | |
|---|---|---|---|---|
| 1 | $SiO_2$ | 500 | | |
| 2 | $Ta_2O_5$ | 239 | | |
| 3 | $SiO_2$ | 221 | | |
| 4 | $Ta_2O_5$ | 1610 | z | |
| 5 | $SiO_2$ | 221 | | |
| 6 | $Ta_2O_5$ | 239 | | |
| 7 | $SiO_2$ | 2156 | | |
| 8 | $Ta_2O_5$ | 239 | | |
| 9 | $SiO_2$ | 221 | | |
| 10 | $Ta_2O_5$ | 1610 | z | Third Stack |
| 11 | $SiO_2$ | 221 | | |
| 12 | $Ta_2O_5$ | 239 | | |
| 13 | $SiO_2$ | 2156 | | |
| 14 | $Ta_2O_5$ | 239 | | |
| 15 | $SiO_2$ | 221 | | |
| 16 | $Ta_2O_5$ | 1610 | z | |
| 17 | $SiO_2$ | 221 | | |
| 18 | $Ta_2O_5$ | 239 | | |
| 19 | $SiO_2$ | 2046 | | |
| 20 | $Ta_2O_5$ | 197 | | |
| 21 | $SiO_2$ | 214 | | |
| 22 | $Ta_2O_5$ | 985 | y | |
| 23 | $SiO_2$ | 214 | | |
| 24 | $Ta_2O_5$ | 197 | | |
| 25 | $SiO_2$ | 1936 | | |
| 26 | $Ta_2O_5$ | 197 | | |
| 27 | $SiO_2$ | 214 | | |
| 28 | $Ta_2O_5$ | 985 | y | |
| 29 | $SiO_2$ | 214 | | |
| 30 | $Ta_2O_5$ | 197 | | |
| 31 | $SiO_2$ | 1936 | | Second Stack |
| 32 | $Ta_2O_5$ | 197 | | |
| 33 | $SiO_2$ | 214 | | |
| 34 | $Ta_2O_5$ | 985 | y | |
| 35 | $SiO_2$ | 214 | | |
| 36 | $Ta_2O_5$ | 197 | | |
| 37 | $SiO_2$ | 1936 | | |
| 38 | $Ta_2O_5$ | 197 | | |
| 39 | $SiO_2$ | 214 | | |
| 40 | $Ta_2O_5$ | 985 | y | |
| 41 | $SiO_2$ | 214 | | |
| 42 | $Ta_2O_5$ | 197 | | |
| 43 | $SiO_2$ | 1764 | | |
| 44 | $Ta_2O_5$ | 1057 | x | |
| 45 | $SiO_2$ | 1592 | | |
| 46 | $Ta_2O_5$ | 1057 | x | |
| 47 | $SiO_2$ | 1592 | | First Stack |
| 48 | $Ta_2O_5$ | 1057 | x | |
| 49 | $SiO_2$ | 1592 | | |
| 50 | $Ta_2O_5$ | 1057 | x | |
| 51 | $SiO_2$ | 796 | | |
| TOTAL | | 39048 | | |

TABLE 2

| Layer Number | Material | Thickness Å |
|---|---|---|
| 1 | $SiO_2$ | 500 |
| 2 | $Ta_2O_5$ | 171 |
| 3 | $SiO_2$ | 315 |
| 4 | $Ta_2O_5$ | 1416 |
| 5 | $SiO_2$ | 312 |
| 6 | $Ta_2O_5$ | 180 |
| 7 | $SiO_2$ | 2113 |
| 8 | $Ta_2O_5$ | 176 |
| 9 | $SiO_2$ | 284 |
| 10 | $Ta_2O_5$ | 1436 |
| 11 | $SiO_2$ | 318 |
| 12 | $Ta_2O_5$ | 217 |
| 13 | $SiO_2$ | 2322 |
| 14 | $Ta_2O_5$ | 228 |

TABLE 2-continued

| Layer Number | Material | Thickness Å |
|---|---|---|
| 15 | $SiO_2$ | 272 |
| 16 | $Ta_2O_5$ | 1801 |
| 17 | $SiO_2$ | 220 |
| 18 | $Ta_2O_5$ | 261 |
| 19 | $SiO_2$ | 2244 |
| 20 | $Ta_2O_5$ | 233 |
| 21 | $SiO_2$ | 310 |
| 22 | $Ta_2O_5$ | 1325 |
| 23 | $SiO_2$ | 152 |
| 24 | $Ta_2O_5$ | 163 |
| 25 | $SiO_2$ | 1895 |
| 26 | $Ta_2O_5$ | 268 |
| 27 | $SiO_2$ | 176 |
| 28 | $Ta_2O_5$ | 1094 |
| 29 | $SiO_2$ | 187 |
| 30 | $Ta_2O_5$ | 294 |
| 31 | $SiO_2$ | 1908 |
| 32 | $Ta_2O_5$ | 1170 |
| 33 | $SiO_2$ | 1823 |
| 34 | $Ta_2O_5$ | 288 |
| 35 | $SiO_2$ | 130 |
| 36 | $Ta_2O_5$ | 1250 |
| 37 | $SiO_2$ | 143 |
| 38 | $Ta_2O_5$ | 289 |
| 39 | $SiO_2$ | 1783 |
| 40 | $Ta_2O_5$ | 1085 |
| 41 | $SiO_2$ | 1593 |
| 42 | $Ta_2O_5$ | 1002 |
| 43 | $SiO_2$ | 1571 |
| 44 | $Ta_2O_5$ | 1049 |
| 45 | $SiO_2$ | 1586 |
| 46 | $Ta_2O_5$ | 993 |
| 47 | $SiO_2$ | 737 |
| | TOTAL | 39283 |

Figure 3:
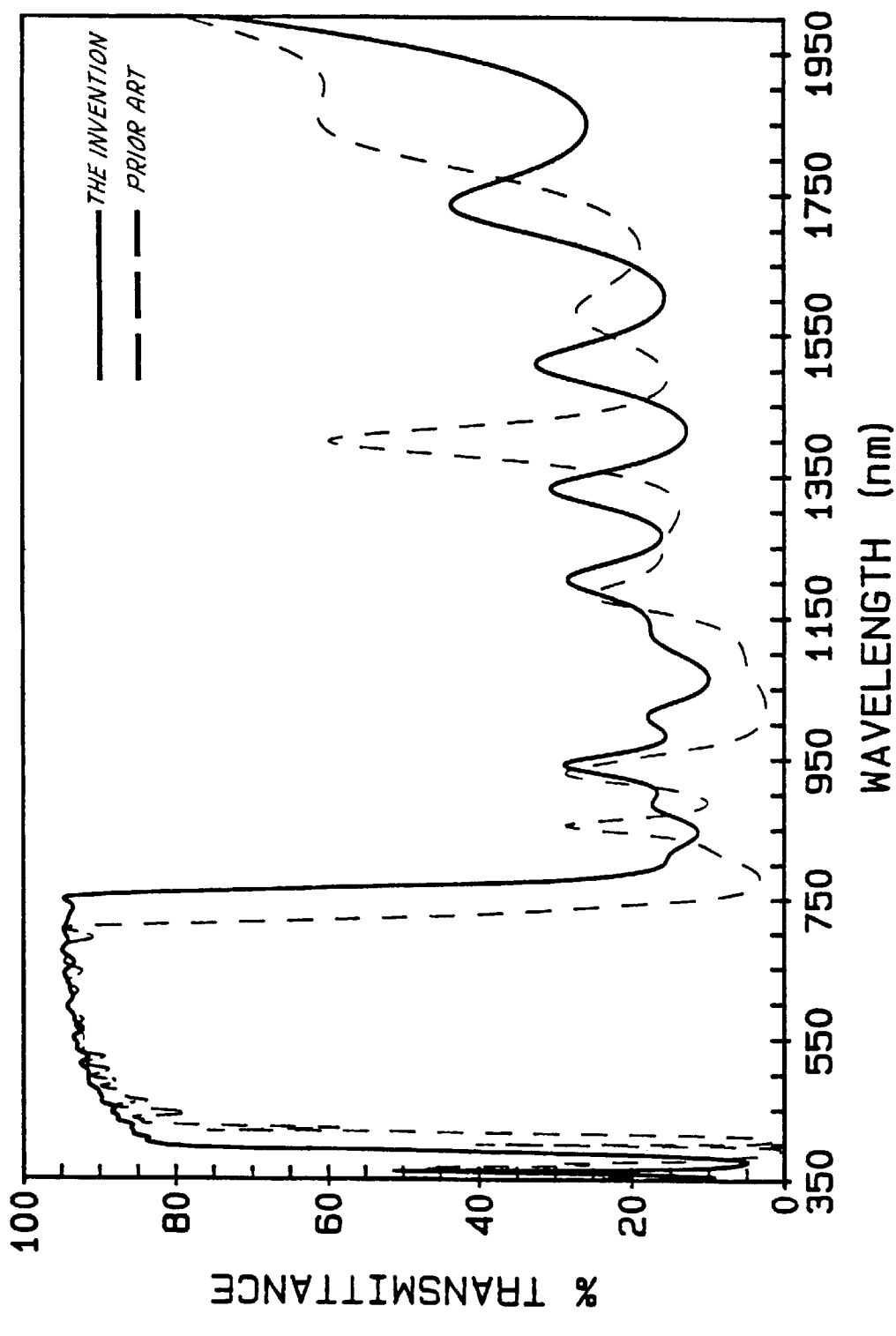
FIG. 3 illustrates the theoretical spectral transmittance of a filter of the present invention and a conventional prior art filter designed for infrared reflectance and visible light transmittance.

FIG. 3 illustrates the theoretical spectral transmittance of two different $SiO_2/Ta_2O_5$ filters which were generated by computer based on the filters being on a flat quartz substrate with the transmission at an angle normal to the surface. The solid line curve represents the computer optimized thin film coating according to the present invention having forty seven (47) layers and at a total thickness of 39283 Å set forth in Table 2 and the dashed line represents a prior art filter coating having twenty five (25) alternating layers of $SiO_2$ and $Ta_2O_5$ at a total thickness of about 39700 Å. Except for the first and last (25th) layers of $SiO_2$, the thickness of all of the layers in the prior filter was at least about 1000 Å.

Turning now to FIG. 3, one can see that the transmittance window of the coating of the present invention in the visible region of from about 400–770 nm is about 20% wider than the prior art coating of substantially equal thickness and exhibits an overall average transmission of at least about 90%. In contrast, the filter of the prior art has a transmittance band only from about 420 to about 720 nm. In the infrared region, the filter of the present invention reflects from about 800–1900 nm with an average reflectance of at least about 75%. The average infrared reflectance is about equivalent for both filters, although the spectral distribution is different. Thus, at equal total coating thickness the filter of the present invention is substantially superior to the prior art filter since the 20% wider visible light window permits much higher manufacturing tolerance in layer thickness and with no noticeable shift in color when viewed at angles other than normal to the surface (i.e., 45°). By way of example, the maximum color deviation produced by 10% layer thickness errors for the filter of this invention illustrated in FIG. 3 is less than the maximum color deviation produced by 5% layer thickness errors for a prior art filter such as the one illustrated in FIG. 3.

Figure 4:
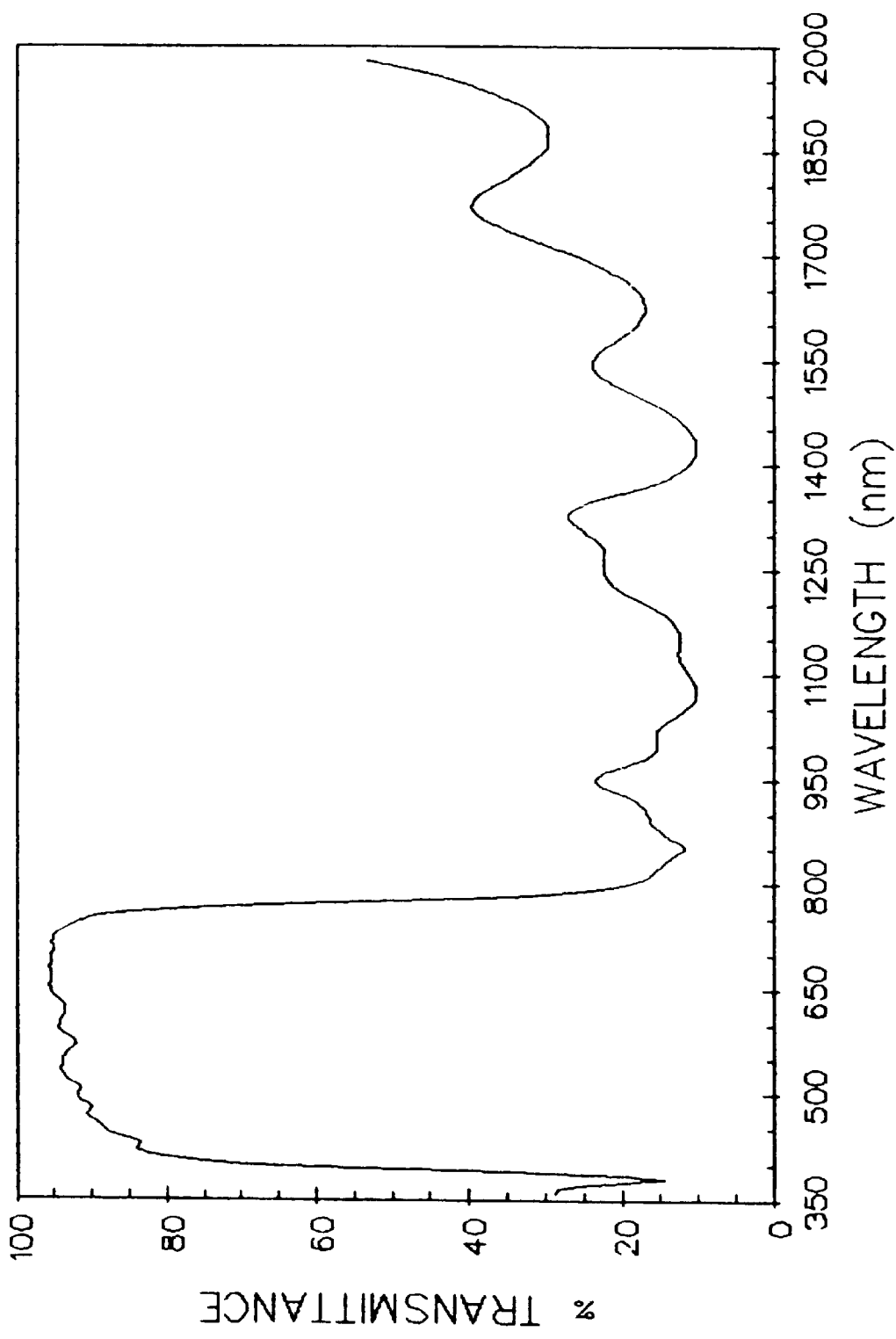
FIG. 4 illustrates the actual spectral transmittance of a filter of the present invention for infrared reflectance and visible light transmittance.

Forty-seven alternating layers of $SiO_2$ and $Ta_2O_5$ were applied to the surface of quartz flats 1 inch×1 inch and 1/8 inch thick according to Table 2 employing an LPCVD coating process. FIG. 4 illustrates the actual spectral transmittance of this coating and demonstrates that the filter of the present invention exhibited at least about 90% average transmittance from about 400 to 770 nm and at least about 70% average reflectance from about 800–1900 nm.

As set forth above, the optical interference coatings of the present invention can be produced by a number of different deposition processes including vacuum thermal evaporation, ion plating, sputtering, CVD, plasma CVD and LPCVD. Of these, LPCVD is particularly preferred for complex shapes such as lamp envelopes. One such process used for lamp coating is an LPCVD process wherein a suitable metal oxide precursor reagent or reagents for each material of the film is separately introduced into a decomposition chamber wherein it is decomposed or reacted to form the metal oxide on a heated substrate. Separate layers of, for example, silica and tantala are applied onto the substrate in this fashion until the desired filter is achieved. Such chemical vapor deposition techniques are well known to those skilled in the art and are disclosed in, for example, U.S. Pat. Nos. 4,006,481; 4,211,803; 4,393,097; 4,435,445; 4,508,054; 4,565,747 and 4,775,203. In forming the metal oxide films of tantala and silica on a substrate in accordance with the present invention, the substrate or object is positioned within a deposition chamber. The chamber is generally contained within a furnace so that the object reaches the desired temperature to achieve the reaction or decomposition and concomitant deposition of the tantala or silica film on the object. These temperatures will generally range between about 350–600° C., depending upon the particular reagent used. For an LPCVD process, the deposition chamber is evacuated and a suitable organometallic precursor of the desired metal oxide, such as tantala or silica, in the vapor state is permitted to flow through the deposition chamber by any suitable means. When the reagent flows into the deposition chamber it is decomposed to deposit a film of either tantala or silica on the substrate. Individual layers of tantala and silica can be uniformly deposited employing this process and have been successfully deposited on both flat and curved substrates such as lamp envelopes. Uniform layers of tantala and silica can be formed ranging from about 100 to 100,000 Å in thickness. When the desired film thickness is achieved, the reagent flow is stopped, the chamber evacuated and the reagent for the other material is flowed into the deposition chamber until the desired thickness of that material is achieved. The process is repeated until the desired multiple layer interference filter is formed.

Illustrative, but non-limiting examples of compounds suitable for use in the present invention for depositing a silica film from LPCVD include tetraethoxy silane, diacetoxy dibutoxy silane, tetraacetoxy silane and silicon tetrakis diethyloxyamine. Suitable reagents for use in the present invention useful for depositing a film of tantala employing LPCVD include tantalum ethoxide, tantalum isopropoxide, tantalum methoxide, tantalum butoxide, mixed tantalum alkoxides and tantalum pentachloride and water and/or oxygen. Titanium tetraethoxide is a suitable reagent for depositing titania and pentaethyl niobiate is useful for depositing niobia. No carrier gas is required in the deposition chamber to facilitate movement of the reagent through the chamber, although an inert carrier gas can also be employed, if desired. The pressure in the chamber during the deposition process will, in general, range between about 0.1–2.0 torr, depending upon the reagent used and the temperature of the substrate. The flow rate of the gaseous reagent in the deposition chamber will generally range between about 10–2,000 SCCM, depending upon the size of the reaction chamber, the reagent, presence of a carrier gas and desired rate of deposition, etc.

Figure 5:
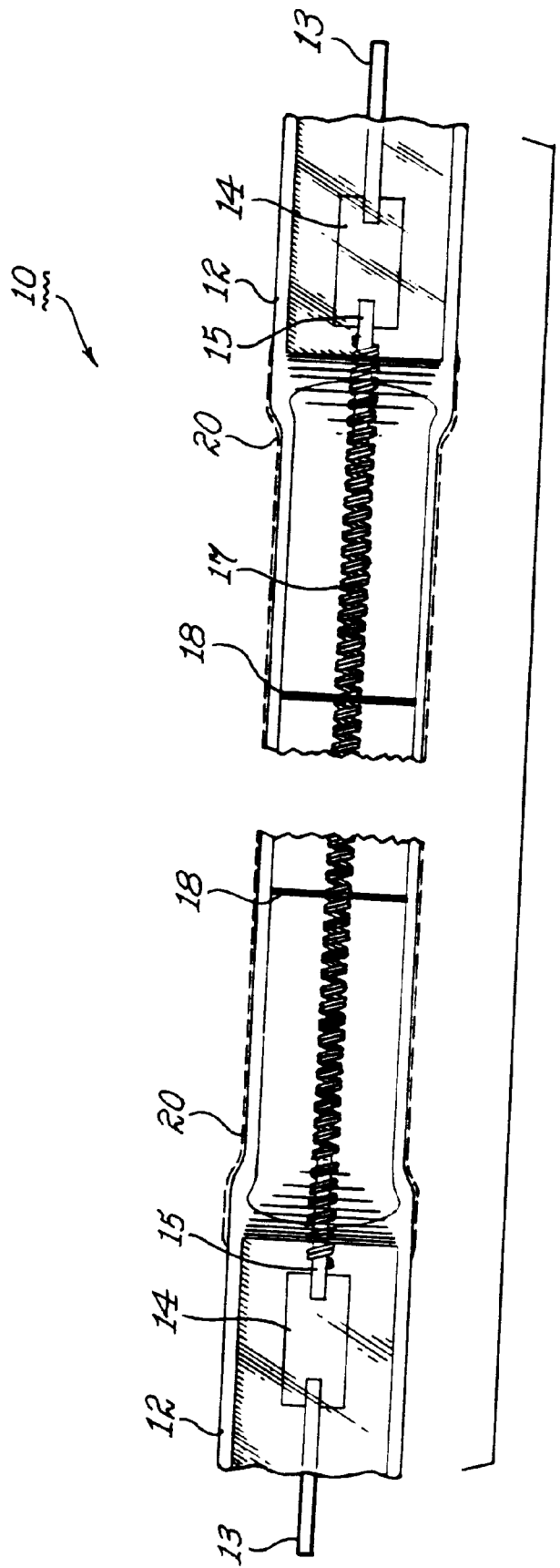
FIG. 5 schematically illustrates an elongated double ended tungsten halogen lamp having an infrared reflecting light interference film according to the present invention on the outer surface of the lamp envelope.

FIG. 5 illustrates one embodiment of the present invention comprising a lamp, the outer surface of which contains a tantala-silica optical interference coating or filter according to the present invention which reflects infrared radiation back to the filament wherein it is converted into visible radiation. The lamp illustrated in FIG. 5 comprises envelope 10 made out of a vitreous, light transmissive material capable of withstanding high temperatures of about 800° C. which, in this case, is quartz (fused silica). Each end of envelope 10 has a pinch seal portion 12 through which is sealed an inlead connector 13 electrically and mechanically attached by suitable means, such as welding, to molybdenum foil 14 which is hermetically sealed and embedded in the pinch seal portion 12 of the lamp. Leads 15 made out of a suitable refractory metal, such as molybdenum or tungsten, are attached to the other end of molybdenum foils 14 at one end and at the other end are connected to tungsten filament 17 which is supported on its axis within the envelope by a plurality of suitable supporting members 18, such as tungsten spiral wire supports of the type disclosed in U.S. Pat. No. 3,168,670. The thin film infrared reflecting, optical interference filter of the present invention is on the outer surface of the lamp as a coating 20.

Figure 6:
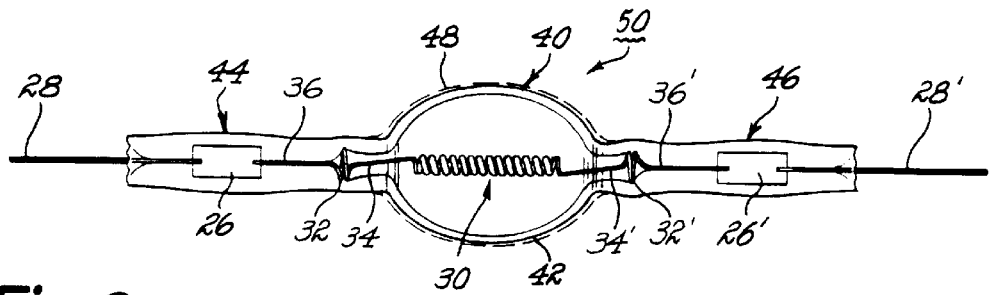
FIG. 6 schematically illustrates a small double ended tungsten halogen lamp having an infrared reflecting film of the present invention on the outer surface of the vitreous lamp envelope.

FIG. 6 illustrates a small size, 60 watt tungsten-halogen lamp 50 comprising vitreous, light transmissive, envelope portion 40 made of quartz or a high temperature aluminosilicate glass of the type disclosed in U.S. Pat. No. 4,238,705, the outer surface of which is coated with a light transmissive, infrared reflecting filter coating 48 of the present invention. By small size is meant that the envelope is about 12 mm long and 10 mm in diameter, with lamp 50 being an overall of about 2¼ inches long. Envelope 40 contains filament assembly 30 wherein both tubular end portions 44 and 46 have been shrink sealed over foil members 26 and 26' to form a hermetic seal and then cut to reduce their length to that desired. Outer leads 28 and 28' extend past the end of tube portions 44 and 46. The other ends of foil members 26 and 26' are welded to legs 36 and 36' of centering spuds 32 and 32'. Spuds 32 and 32' comprise a circular ring or coil made of a suitable refractory metal wire such as molybdenum, tungsten and the like having at least one complete turn and terminating in leg portions 36 and 34 and 36' and 34', respectively. Leg portions 34 and 34' are welded to filament 30 by suitable means and preferably plasma welding or laser welding. Spuds 32 and 32' serve to radially align filament 30 along the optical center of envelope 40. This is necessary due to the small (i.e., 1–2 mm) diameter of the filament. Shrink seals are particularly preferred in small size filament and arc lamps because deformation and misalignment of the tube portions of the lamp envelope are minimal as compared with that which can occur with pinch sealing. Shrink seals are known to those skilled in the art and examples of how to obtain same are found, for example, in U.S. Pat. Nos. 4,389,201 and 4,810,932, the disclosures of which are incorporated herein by reference. The interior of filament chamber 42 contains an inert gas such as argon, xenon or krypton along with minor (i.e., <10%) amounts of nitrogen, one or more halogen compounds such as methyl bromide. dibromomethane, dichlorobromomethane and the like, and a gettering material such as phosphorous.

Alternating layers of $SiO_2$ and $Ta_2O_5$ were applied to the outer surface of the vitreous envelope of 60 watt tungsten-halogen incandescent lamps of the type illustrated in FIG. 6, employing an LPCVD coating process according to the computer optimization set forth in Table 2 for a total of forty-seven (47) alternating layers of $SiO_2$ and $Ta_2O_5$ with a total thickness of about 39300 Å. Similar lamps were coated by the same LPCVD deposition process with a prior art filter comprising twenty-five (25) alternating layers of $SiO_2$ and $Ta_2O_5$, for a total thickness of about 39700 Å. Except for the first and twenty fifth layers of $SiO_2$, all of the layers in this prior art filter were at least about 1000 Å thick. The lumens per watt light output of both lamps was about the same and both exhibited 40% greater light output than similar, uncoated lamps. However, the lamps coated with the filter of the present invention exhibited superior color characteristics than those coated with the prior art filter.

Figure 7:
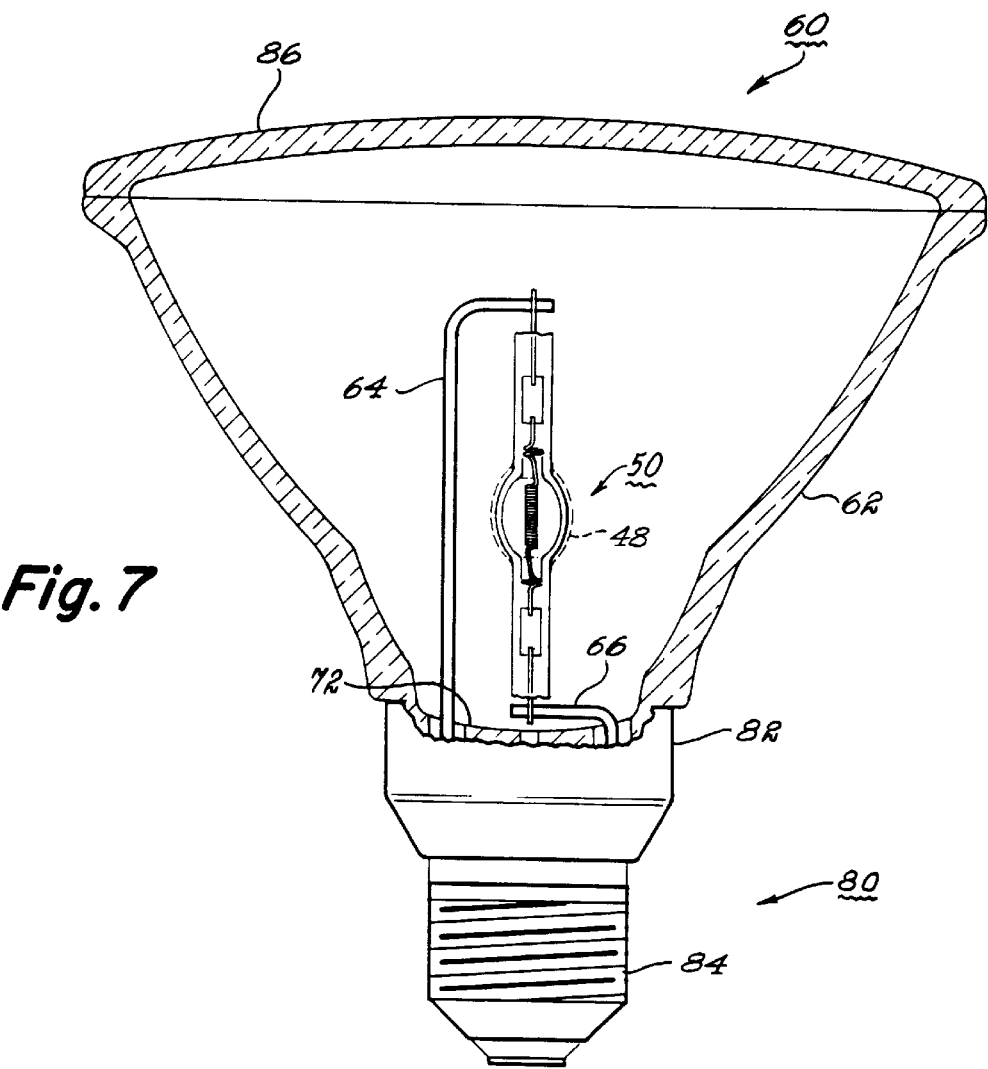
FIG. 7 schematically illustrates the tungsten halogen lamp of FIG. 6 mounted in a parabolic reflector.
Figure 8:
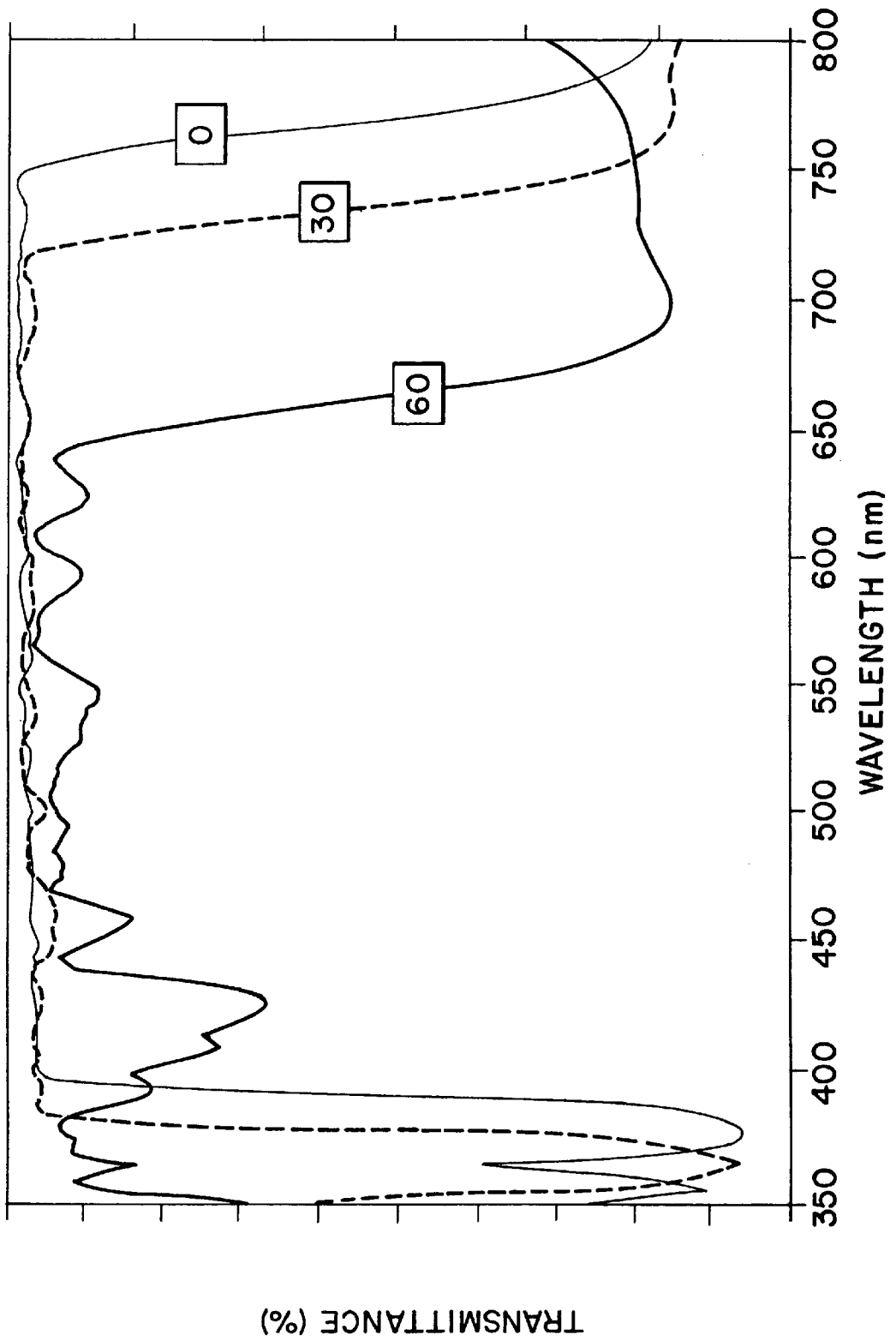
FIG. 8 graphically represents the percent transmittance at 0, 30 and 60 degree angles of incidence to an interference film according to the present invention.

Lamp 50 having filter coating 48 on the exterior portion of the lamp envelope is shown assembled into a parabolic reflector 62 illustrated in FIG. 7. Thus, turning to FIG. 7, combination 60 contains lamp 50 mounted into the bottom portion of parabolic glass reflector 62 by means of conductive mounting legs 64 and 66 which project through seals (not shown) at the bottom portion 72 of glass reflector 62. Lamp base 80 is crimped onto the bottom portion of the glass reflector by means not shown at neck portion 82. Screw base 84 is a standard screw base for screwing the completed assembly 60 into a suitable socket. Glass or plastic lens or cover 86 is attached or hermetically sealed by adhesive or other suitable means to the other end of reflector 62 to complete the lamp assembly.

The filter coating of the present invention will also be useful for single ended tungsten-halogen lamps and also for other types of lamps such as arc discharge lamps. Thus, lamp 50 illustrated in FIG. 6 could also be an arc discharge lamp with electrodes in place of the filament. Accordingly, in a broader sense the coating of the present invention is useful as a filter on a light transmissive envelope containing an electric light source within. Still further, the coating of the present invention may be applied to a light transmissive shroud surrounding at least a portion of a filament, filament lamp or arc tube.

The filter of the present invention is not limited to use with lamps nor is it limited to the refractory metal oxides such as tantala, titania, niobia and silica known to be suitable for use with lamps at temperatures in excess of 400° C. or 500° C. The foregoing examples are merely illustrative of one embodiment of carrying out and practicing the invention.

What is claimed is:

1. An optical interference coating for reflecting infrared radiation and transmitting visible light radiation which comprises a plurality of alternating high and low refractive index layers, said coating having a spectrally broad high transmittance of at least about 90% average at a normal angle of incidence between about 400 to 770 nm, a spectrally broad high transmittance of at least about 90% average at about a 30 degree angle of incidence between about 400 to 700 nm and a spectrally broad high reflectance of at least about 70% average between about 800 to 1900 nm.

2. The coating of claim 1 comprising three multiperiod, spectrally adjacent stacks.

3. The coating of claim 2 wherein one of the stacks is a first stack and is a short wave pass stack.

4. The coating of claim 3 wherein the second and third stacks are spectrally located at wavelengths different from each other and longer than the wavelength of the short wave pass stack.

5. The coating of claim 4 wherein each of said stacks has at least two periods.

6. The coating of claim 5 wherein some of said high and low refractive index layers in said periods of said second and third stacks have an optical thickness no greater than one-twentieth of the stack wavelength.

7. The coating of claim 6 wherein said short wave pass stack is a quarterwave stack.

8. The coating of claim 7 wherein said high and low refractive index layers comprise refractory metal oxide.

9. The coating of claim 8 wherein said refractive metal oxide comprises silica and an oxide selected from the group consisting essentially of tantala, titania and niobia.

10. The optical interference coating of claim 1 having at least 46 layers.

11. The coating of claim 1 further comprising at least about 40 alternating high and low refractive index layers.

12. The coating of claim 11 wherein each layer is less than about 3,000 angstroms thick.

13. The coating of claim 12 wherein the combined thickness of the layers is less than about 40,000 angstroms.

14. An electric lamp comprising a light transmissive envelope containing an electric light source within wherein at least a portion of said envelope is coated with an optical interference coating for reflecting infrared radiation and transmitting visible light radiation, said coating comprising a plurality of alternating high and low refractive index layers and having a spectrally broad high transmittance of at least about 90% average at a normal angle of incidence between about 400 to 770 nm, a spectrally broad high transmittance of at least about 90% average at about a 30 degree angle of incidence between about 400 to 700 nm and a spectrally broad high reflectance of at least about 70% average between about 800 to 1900 nm.

15. The lamp of claim 14 wherein said coating comprises three multiperiod, spectrally adjacent stacks.

16. The lamp of claim 15 wherein one of the stacks in said coating is a first stack and is a short wave pass stack.

17. The lamp of claim 16 wherein the second and third stacks of said coating are spectrally located at wavelengths different from each other and longer than the wavelength of said short wave pass stack.

18. The lamp of claim 17 wherein at least a portion of the layers in said second and third stacks have an optical thickness no greater than one-twentieth of the stack wavelength.

19. The lamp of claim 18 wherein each of said stacks in said coating has at least two periods.

20. The lamp of claim 19 wherein said periods in said second and third stacks contain seven layers including a central layer of high refractive index material having an optical thickness no greater than about one-quarter of the stack wavelength with a pair of low and high refractive index layers being adjacent both sides of said central layer wherein each of said two layers of each of said two pairs has an optical thickness no greater than one-twentieth of the stack wavelength with said low refractive index layer in each pair being adjacent said central layer and with a low refractive index layer having an optical thickness no greater than one-eighth of the stack wavelength being adjacent each high refractive index layer of each pair.

21. The lamp of claim 20 wherein each of said high and low refractive index layers in both of said pairs adjacent said central layer has an optical thickness no greater than one-twentieth of the stack wavelength.

22. The lamp of claim 21 wherein said first stack is a quarterwave stack.

23. The lamp of claim 22 wherein said layers comprise refractory metal oxide.

24. The lamp of claim 23 wherein said oxide includes silica and an oxide selected from the group consisting of tantala, titania and niobia.

25. The lamp of claim 24 wherein said light source is a filament.

26. The lamp of claim 24 wherein said light source is an arc discharge.

27. A tungsten halogen incandescent lamp comprising a vitreous, light transmissive envelope made of fused quartz having a filament chamber with a tungsten filament and at least one halogen hermetically enclosed within said chamber, wherein said filament has a longitudinal axis which is radially aligned along the optical center or axis of said chamber and wherein at least a portion of the exterior surface of said chamber is coated with an optical interference coating for reflecting infrared radiation and transmitting visible light radiation which comprises a plurality of alternating high and low refractive index layers, said coating having a spectrally broad high transmittance of at least about 90% average at a normal angle of incidence between 400 to 770 nm with no substantial portion of said transmittance in said 400–770 nm range being below about 80%, a spectrally broad high transmittance of at least about 90% average at about a 30 degree angle of incidence between about 400 to 700 nm and a spectrally broad high reflectance of at least about 70% average between about 800 to 1900 nm.

28. The coating of claim 27 wherein said refractive metal oxide comprises silica and an oxide selected from the group consisting essentially of tantala, titania and niobia.

29. An optical interference coating for reflecting infrared radiation and transmitting visible light radiation which comprises a plurality of alternating high and low refractive index layers, said coating having a spectrally broad high transmittance of at least about 90% average at a normal angle of incidence over a range of 370 nm in the visible portion of the spectrum, a spectrally broad high transmittance of at least 90% average over a range of 300 nm in the visible spectrum at an angle of incidence of about 30 degrees and a spectrally broad high reflectance of at least about 70% average between about 800 to 1900 nm.

30. The coating of claim 29 comprising three multiperiod, spectrally adjacent stacks.

31. The coating of claim 30 wherein one of the stacks is a first stack and is a shortwave pass stack.

32. The coating of claim 31 wherein the second and third stacks are spectrally located at wavelengths different from each other and longer than the wavelength of the shortwave pass stack.

33. The coating of claim 32 wherein each of said stacks has at least two periods.

34. The coating of claim 33 wherein some of said high and low refractive index layers in said periods of said second and third stacks have an optical thickness no greater than one-twentieth of the stack wavelength.

35. The coating of claim 34 wherein said shortwave pass stack is a quarterwave stack.

36. The coating of claim 35 wherein said refractive metal oxide comprises silica and an oxide selected from the group consisting essentially of tantala, titania and niobia.

37. A tungsten halogen incandescent lamp comprising a vitreous, light transmissive envelope having a filament chamber with a tungsten filament and at least one halogen hermetically enclosed within said chamber, wherein said filament has a longitudinal axis which is radially aligned along the optical center of said chamber with at least a portion of the outer surface of said chamber coated with an optical interference coating for reflecting infrared radiation and transmitting visible light radiation, said coating comprising a plurality of alternating high and low refractive index layers and having a spectrally broad high transmittance of at least about 90% average at a normal angle of incidence over a range of 370 nm in the visible portion of the spectrum, a spectrally broad high transmittance of at least about 90% average at about a 30 degree angle of incidence between about 400 to 700 nm and a spectrally broad high reflectance of at least about 70% average between about 800 to 1900 nm.

38. The coating of claim 37 comprising three multiperiod, spectrally adjacent stacks.

39. The coating of claim 38 wherein one of the stacks is a first stack and is a shortwave pass stack.

40. The coating of claim 39 wherein the second and third stacks are spectrally located at wavelengths different from each other and longer than the wavelength of the shortwave pass stack.

41. The coating of claim 40 wherein each of said stacks has at least two periods.

42. The coating of claim 41 wherein some of said high and low refractive index layers in said periods of said second and third stacks have an optical thickness no greater than one-twentieth of the stack wavelength.

43. The coating of claim 42 wherein said shortwave pass stack is a quarterwave stack.

* * * * *